(12) United States Patent
Woodell

(10) Patent No.: US 6,424,288 B1
(45) Date of Patent: Jul. 23, 2002

(54) MULTI-SWEEP METHOD AND SYSTEM FOR DETECTING AND DISPLAYING WEATHER INFORMATION ON A WEATHER RADAR SYSTEM

(75) Inventor: Daniel L. Woodell, Robins, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 20 days.

(21) Appl. No.: 09/668,674

(22) Filed: Sep. 22, 2000

(51) Int. Cl.[7] ............................................. G01S 13/95
(52) U.S. Cl. ......................... 342/26; 342/342; 342/75; 342/158
(58) Field of Search ............................ 342/26, 74, 75, 342/76, 77, 78, 79, 80, 158, 159, 160, 161, 162, 163, 164, 175, 192, 193, 194, 195, 196, 197

(56) References Cited

U.S. PATENT DOCUMENTS

| | | | |
|---|---|---|---|
| 3,781,878 A | * 12/1973 | Kirkpatrick | 342/26 |
| 3,885,237 A | * 5/1975 | Kirkpatrick | 342/26 |
| 5,920,276 A | * 7/1999 | Frederick | 342/26 |
| 6,154,169 A | * 11/2000 | Kuntman | 342/74 |
| 6,184,816 B1 | * 2/2001 | Zheng et al. | 342/26 |
| 6,201,494 B1 | * 3/2001 | Kronfeld | 342/26 |
| 6,236,351 B1 | * 5/2001 | Conner et al. | 342/26 |
| 6,340,946 B1 | * 1/2002 | Wolfson et al. | 342/26 |

OTHER PUBLICATIONS

Co-pending patent application Docket No. 00CR092/KE entitled "Method And System For Suppressing Ground Clutter Returns On An Airborne Weather Radar" filed on an even date, inventor D. Woodell.

Co-pending patent application Docket No. 00CR218/KE entitled "Multi-Sweep Method And System For Mapping Terrain With A Weather Radar System" filed on an even date, inventor D. Woodell.

Co-pending patent application Docket No. 00CR028/KE entitled "Method And System For Detecting Turbulence With Reduced Errors Resulting From Vertical Shear Components" filed on an even date, inventor D. Woodell et al.

* cited by examiner

Primary Examiner—John B. Sotomayor
(74) Attorney, Agent, or Firm—Nathan O. Jensen; Kyle Eppele

(57) ABSTRACT

A system and method for detecting, processing, and displaying weather radar information which uses multiple scans, at differing antenna tilt angles, to generate a single displayed image. This can be used to reduce displaying of ground clutter returns and to simultaneously increase the range of weather information displayed on a single image.

20 Claims, 3 Drawing Sheets

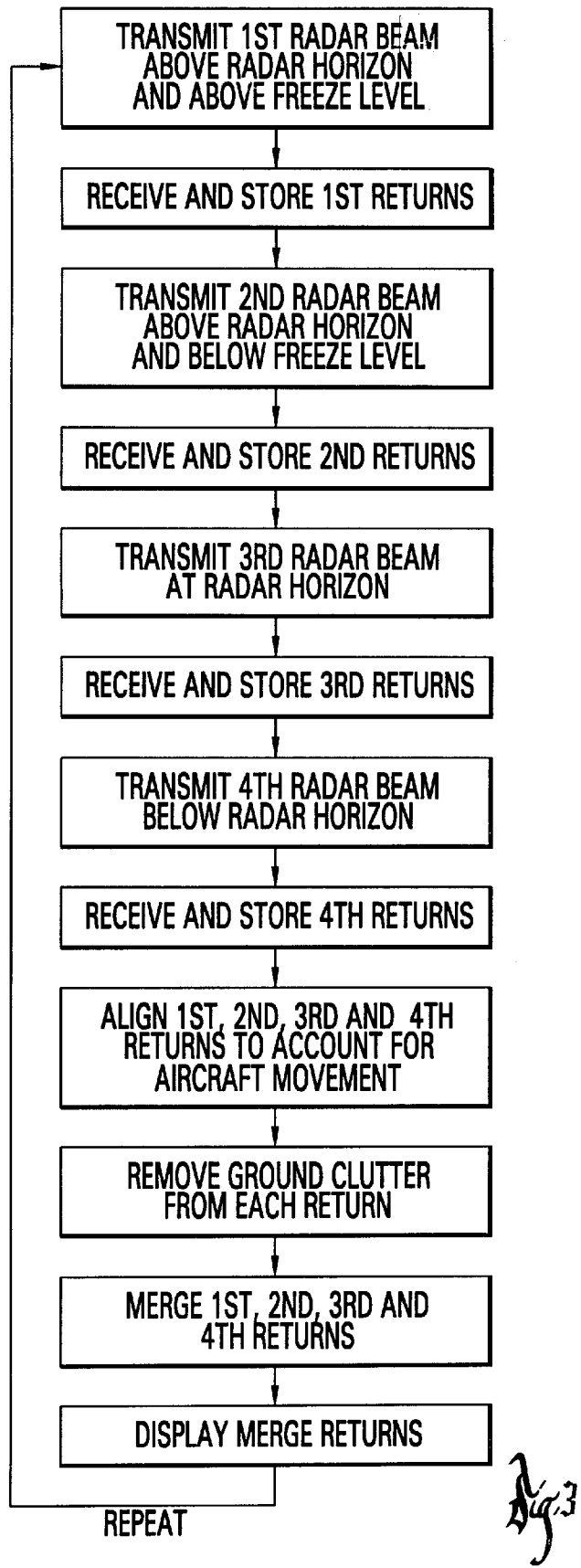

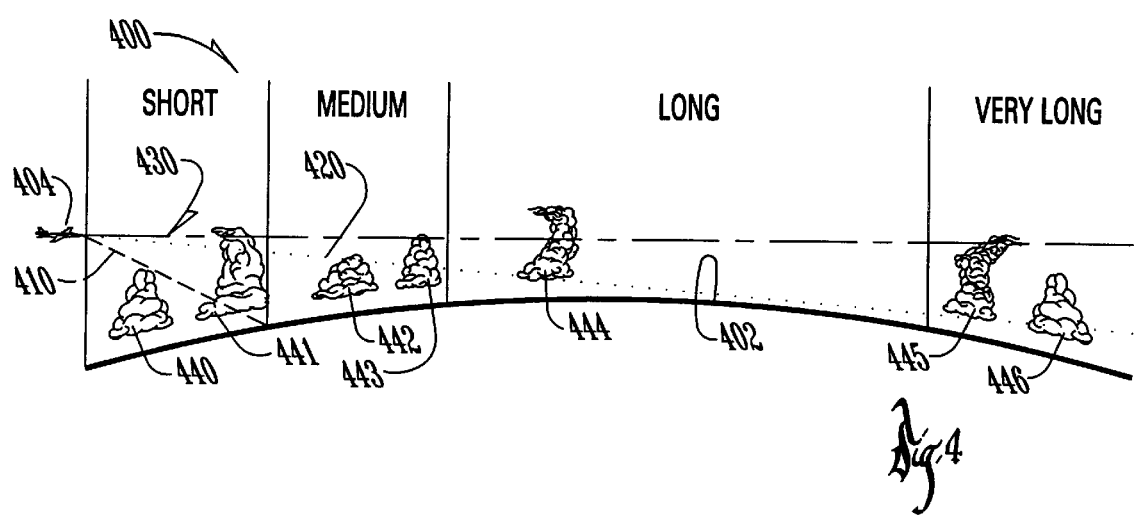

MULTI-SWEEP METHOD AND SYSTEM FOR DETECTING AND DISPLAYING WEATHER INFORMATION ON A WEATHER RADAR SYSTEM

CROSS REFERENCE TO RELATED APPLICATIONS

This application relates to an application entitled "MULTI-SWEEP METHOD AND SYSTEM FOR MAPPING TERRAIN WITH A WEATHER RADAR SYSTEM" by Daniel L. Woodell, and also relates to another application entitled "METHOD AND SYSTEM FOR DETECTING TURBULENCE WITH REDUCED ERRORS RESULTING FROM VERTICAL SHEAR COMPONENTS", by Daniel L. Woodell, Roy Robertson, and Ying C. Lai; and further relates to an application entitled "METHOD AND SYSTEM FOR SUPPRESSING GROUND CLUTTER RETURNS ON AN AIRBORNE WEATHER RADAR" by Daniel L. Woodell, all filed on even date herewith and assigned to a common assignee, which applications are incorporated herein in their entirety by this reference.

FIELD OF THE INVENTION

The present invention generally relates to radars, and more particularly relates to weather radars, and even more particularly relates to methods and systems for using multiple sweeps to improve performance of weather radars.

BACKGROUND OF THE INVENTION

In recent years, avionics engineers have endeavored to improve safety of flight and reduce pilot workload. Often, it is difficult to simultaneously achieve these two desirable results. One example of this is in the area of weather radar where pilots have had long-standing problems with discerning ground clutter from weather returns.

Pilots have frequently used an antenna tilting technique where the tilt angle of the transmitted radar beam is adjusted in flight to provide two different views from the radar. The term "beam" is used herein to refer to the entire transmission area during a single azimuthal sweep of the antenna at a single tilt angle. One tilt angle might be directed to be slightly above the radar horizon. This tilt angle, in conjunction with known ground clutter suppression techniques, is often used to deliver an image with the best elimination of ground clutter. However, this tilt angle has limitations in effective range. To overcome these range limitations, the pilot may then adjust the radar beam downward so as to just graze the ground at the radar horizon or involve the ground at some point nearer the aircraft. The pilot must then mentally process the information displayed and make some attempts to determine which displayed returns are a result of ground clutter and which are actual weather returns.

While these pilot-controlled tilt adjustments have been used extensively in the past, they do have some drawbacks. First of all, leaving the radar beam above the radar horizon compromises the primary function of the radar, which is weather detection. A beam directed at too high of an angle will, due to the curvature of the earth, miss some storms at long range. It will also not detect some weather at short and mid ranges as well. For example, a beam directed at too high of an angle will not detect "overflight" weather. This term should be understood to be weather which, while not in the path of the aircraft, the plane will fly over and which can produce turbulent air in the flight path. Additionally, the tops of storms are often comprised of moisture in the form of ice crystals, which generally are known to deliver weaker radar returns than liquid moisture usually found at lower altitudes. Addressing these limitations requires the pilot to manually adjust the tilt angle of the transmitted radar beam to several different tilt angles to get a complete picture of the weather situation and hazards. This can be a significant effort. (Note: auto-tilt radars have been used to help reduce pilot workload relating to finding the proper angle above the radar horizon.) As mentioned above, if the beam is too far above the radar horizon, it dramatically affects both the long and short-range limits of the radar. If it is below the radar horizon, then it will produce heavy ground clutter. More importantly, these attempts to improve effective range, (whether by manual tilt by the pilot or auto-tilt by the radar system), have increased pilot workload, in that the pilot is now required to view multiple radar images and mentally process the differences in the images to determine what is and is not ground clutter. This process is time consuming and is a potential source of pilot error, especially for inexperienced and fatigued pilots, and for pilots busy with other important piloting tasks.

Recently, weather radars have been introduced which utilize on-board position determination equipment, such as GPS, and terrain databases to automatically control the tilt angle of the radar. For example, when such an aircraft approaches a mountain, the system, in an attempt to limit ground clutter, limits the tilt angle of the weather radar to only beams which are above the mountains. The use of only these higher tilt angles is effective at reducing ground clutter, but only with the drawbacks discussed above.

Consequently, there exists a need for improved methods and systems for detecting and displaying weather information in an efficient manner.

SUMMARY OF THE INVENTION

It is an object of the present invention to provide a system and method which enhances safety of flight.

It is a feature of the present invention to utilize a weather radar which. uses multiple sweeps to generate a single weather display image to the pilot.

It is an advantage of the present invention to achieve improved efficiency in interpreting the significance of returns displayed on a weather radar display.

It is another advantage of the present invention to increase the range of displayed weather information.

It is yet another advantage of the present invention to increase the awareness of the pilot of short-range and overflight weather conditions.

It is another advantage to reduce pilot workload required to derive weather hazard information from the radar and reduce training required for pilot operation and use of the radar system.

The present invention is an apparatus and method for detecting and displaying weather information which is designed to satisfy the aforementioned needs, provide the previously stated objects, include the above-listed features, and achieve the already articulated advantages. The present invention is carried out in a manner that utilizes multiple scans or antenna sweeps, each at an optimal tilt setting for a selected portion of the radar's surveillance range, that are then used to generate a single image of weather information.

Accordingly, the present invention is a system and method including a weather radar detection, processing and display apparatus which uses information from multiple scans to generate a single displayed weather information image.

BRIEF DESCRIPTION OF THE DRAWINGS

The invention may be more fully understood by reading the following description of the preferred embodiments of the invention, in conjunction with the appended drawings wherein:

FIG. 3 is a simplified view of the method of the present invention.

FIG. 4 is a simplified view of the method of present invention which shows the relationship between radar beams taken at several tilt angles.

DETAILED DESCRIPTION

Figure 1:
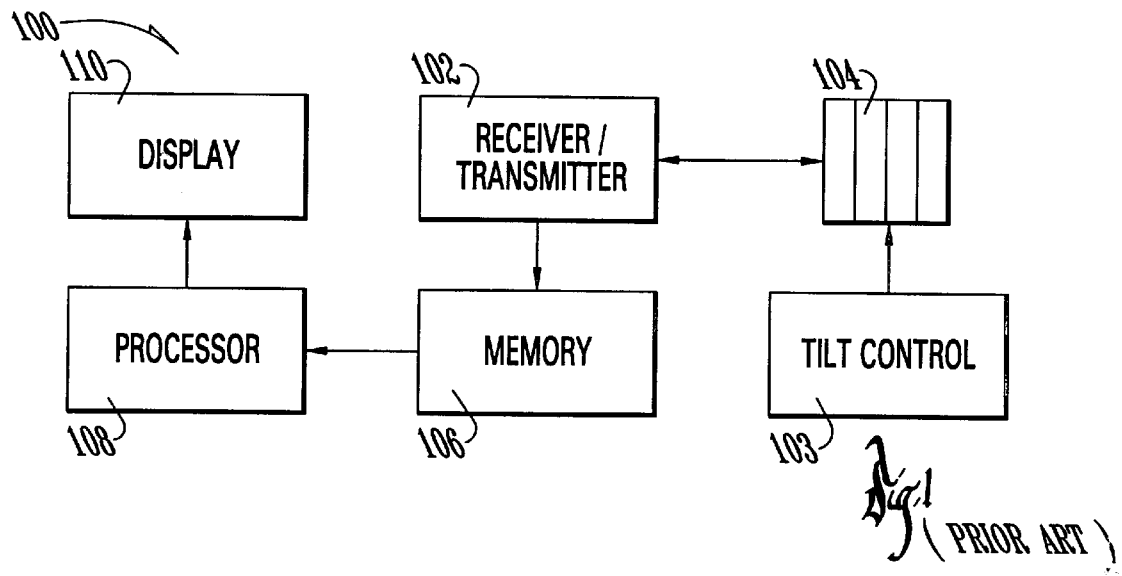
FIG. 1 is a simplified block diagram view of a weather radar system of the prior art.

Now referring to the drawings wherein like numerals refer to like matter throughout, and more specifically referring to FIG. 1, there is shown a system of the prior art, generally designated 100, including a weather radar receiver/transmitter 102 coupled to a weather radar adjustable antenna 104. A manual antenna tilt control system 103 is included for manually controlling the tilt angle of the antenna by the pilot. This system is generally used by a pilot to manually adjust the tilt angle. In some recent developed prior art systems, this tilt control is automated and is provided with information from a GPS receiver or some inertial navigation system, together with a terrain database to automatically adjust the tilt angle of the antenna so as to be pointed substantially above the terrain known to exist in front of the aircraft. In some prior art systems, the displays have been improved with an additional single scan smoothing memory 106, which is used to store one scan and limit the display of radically different data on the next sweep. Weather radar return processing unit 108 is used to suppress ground clutter and perform time-based smoothing operations, as well as other well-known functions of an avionics weather radar system 100. The degree of integration of the components 102, 103, 104, 106, 108, and 110 is a matter of designer's choice, and numerous prior art systems have many variations to those described above.

Figure 2:
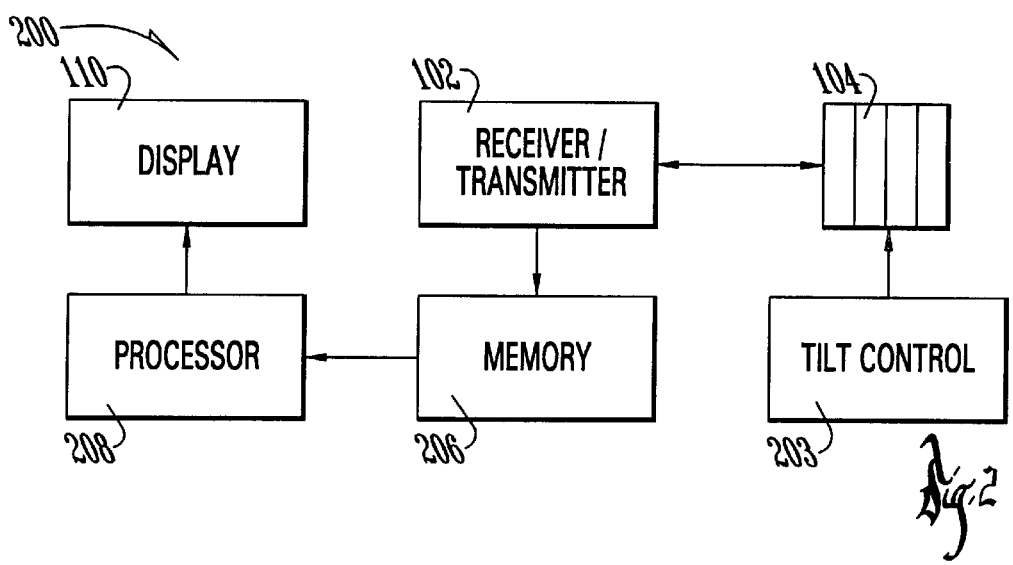
FIG. 2 is a simplified view of a block diagram view of a weather radar system of the present invention.

A detailed understanding of the present invention can be achieved by now referring to FIG. 2, which shows the avionics weather radar system of the present invention, generally designated 200, having a weather radar receiver/transmitter 102, a weather radar adjustable antenna 104 and a multi-scan, multi-tilt angle, memory 206. Also included is a tilt control 203 for automatically controlling the tilt angle of the antenna 104; this auto control may include an additional manual control feature as well. This automatic tilt control 203 must receive information from other navigation equipment, such as a GPS, inertial navigation system, altimeters, etc., so as to provide for automation of the process of directing the transmitted radar beam at an angle above the radar horizon and at angles at the radar horizon, as well as angle below the radar horizon. The angles above the radar horizon may often be in the range of 1.5 degrees above the horizon. The angle below the horizon is a function of altitude and stage of flight. This navigation equipment need not include, but it may include a geo-referenced terrain database for assisting in the determination of the proper radar horizon. The term "radar horizon" is used to refer to the line in front of the aircraft which separates the terrain from the sky. Obviously, the existence of nearby mountains can affect the location of the radar horizon. Additionally, the tilt control 203 is coupled to some device which provides for information relating to the freezing altitude in the area about the aircraft. The antenna can be directed to a point just below the freezing altitude to maximize radar returns.

This multi-scan, multi-tilt angle, memory 206 is believed to be new to the industry. Preferably, this memory is capable of storing in a readily addressable and rapidly retrievable manner, at least two, but preferably four or more, data sets resulting from four or more antenna sweeps at different angles.

The data in multi-scan, multi-tilt angle, memory 206 is used to achieve the beneficial properties of the present invention. The multi-scan, multi-tilt angle, weather radar return processing unit 208 will perform the customary functions performed by weather radar return processing unit 108, plus it will perform several additional operations based upon the additional data available in multi-scan, multi-tilt angle, memory 206. In general, multi-scan, multi-tilt angle, weather radar return processing unit 208 will merge or cross qualify portions, or ranges, of the radar returns of several different antenna sweeps at several different tilt angles, so that a single relatively clutter-free image is presented to the pilot based upon the several separate scans. Multi-scan, multi-tilt angle, weather radar return processing unit 208 will need to compensate for aircraft position changes between scans by rotating and translating the stored images to assure proper alignment during the merging process. This rotation and translation can be done with the aid of an on-board inertial reference system, such as a gyro, airspeed indicator, altimeters, GPS, accelerometers, etc. The merging and cross-qualification process can be tailored for each type of system being designed. However, in general, the merging process would typically be implemented by a software program or hardware configuration which effectively utilizes the following rules or assumptions to process radar return data:

1. Returns from a beam directed substantially above the radar horizon are presumed to be weather.
2. Returns substantially beyond the radar horizon are presumed to be weather.
3. Dramatically increased returns caused by moving the radar from a tilt angle directed slightly above the freezing altitude to a tilt angle directed to a level slightly below the freezing altitude, will be presumed to be weather.
4. Returns having a very large vertical extent are presumed to be weather.
5. Returns which are at a shorter range than the known distance to ground (at the given tilt angle) are considered weather.
6. Spectral discriminators can also be used to differentiate weather from ground echoes during the merging process.

An even more detailed understanding of the present invention may be achieved by now referring to FIG. 3, which shows a simplified flowchart of some of the steps in the process of the present invention.

A first beam is transmitted above the radar horizon. The beam may be first targeted at points at freeze altitude line, above which moisture is present in the form of hard to detect ice crystals. The system of the present invention may include a mechanism for manual input of freeze altitude, or it may include automatic data link means for receiving this information from ground stations and providing the same to be used by the multi-scan, multi-tilt angle, weather radar return processing unit 208. The system may use the GPS, terrain database, etc. to control the tilt control 203. These returns are stored in multi-scan, multi-tilt angle, memory 206. While this discussion is focused upon a first beam being directed at or below the freeze altitude line, it should be understood that in a preferred embodiment that a default or fixed initial tilt angle may be desired. In such cases, this would be the likely first beam to be transmitted. It would also be merged and cross-qualified with the other beams as well.

A second beam is transmitted above the radar horizon but below the freeze level, so as to collect returns emanating from liquid moisture in the air. These returns are stored in multi-scan, multi-tilt angle, memory 206.

A third beam is transmitted at the radar horizon, and the returns are stored in multi-scan, multi-tilt angle, memory 206.

A fourth beam is transmitted below the radar horizon and the returns stored in multi-scan, multi-tilt angle, memory 206.

Multi-scan, multi-tilt angle, weather radar return processing unit 208 is used to align the returns from the $1^{st}$, $2^{nd}$, $3^{rd}$, and $4^{th}$ beams, so as to account for aircraft movement occurring during the time interval between 4 sweeps.

Known ground clutter is removed from each of the returns using well-known ground clutter suppression techniques. Also, ground clutter suppression techniques described in the above cross-referenced co-pending patent applications could be implemented as well.

Predetermined portions of the four returns are merged to arrive at a single long-range ground clutter-reduced weather image.

Now referring to FIG. 4, there is shown a simplified scene of the method of the present invention, generally designated 400, including the earth 402, the aircraft 404 containing the equipment of the present invention. The scene is arbitrarily divided into four labeled ranges, short, medium, long, and very long. A low tilt angle beam 410 is shown as a dashed line extending from the aircraft to a point on the earth. Low tilt angle beam 410 is used primarily to detect overflight weather which could cause turbulence. Low tilt angle beam 410 is shown having a storm 440 disposed therein. This storm would not likely be detected by beams which have substantially higher tilt angles. However, low tilt angle beam 410 will produce heavy, but generally predictable ground clutter. Known techniques of ground clutter suppression can be used to improve the quality an image produced using these returns. Additionally, the new ground clutter suppression technique of the above-referenced patent application could be very helpful in processing the returns from low tilt angle beam 410.

Tangential beam 420 is shown as a dotted line while high tilt angle beam 430 is shown as a dashed and dotted line. All three beams 410, 420, and 430 are shown as detecting storm 441, while only beam 410 detects storm 440. A system which does not use low tilt angle beams will likely be unable to provide the pilot with the best information regarding "overflight" storms, such as storm 440. The pilots would have little warning or explanation of turbulence likely to exist above storm 440. Storm 442 is shown as being detected by tangential beam 420, while storm 443 is detected by beams 420 and 430. Storm 444 is shown as in the path of both beams 420 and 430; however, at this range, beam 420 is expected to produce considerable ground clutter. Consequently, the merging process would emphasize the returns from high tilt angle beam 430 for storm detection in this the "long" range. In the very long range, only storm 445 would be detectable by both the tangential beam 420 and the high tilt angle beam 430. Consequently, the merging and cross-qualification process would emphasize returns from the tangential beam 420 in the very long-range area. However, if weather is detected with the high tilt angle beam in the very long-range area, it would be utilized as well. Consequently, the final image to be displayed to the pilot will draw upon all three beams. Which portion of which beam is used for which portion of the display will be determined largely by the tilt angles and should be readily apparent from FIG. 4. For example, low tilt angle beam 410 is used primarily for short ranges, while tangential beam 420 is used primarily for medium and very long ranges and is not used as much for long ranges because it is here where beam 420 will produce significant ground clutter. High tilt angle beam 430 will be used whenever it detects a storm; however, due to its high tilt angles, it may miss many of the smaller storms which are otherwise detectable. High tilt angle beam 430 is very beneficial in the long-range segment because of its relatively low involvement with the ground.

To the extent that two or more beams detect weather at the same range, it is now possible to generate a field of angles which represents the vertical extent of weather about the aircraft. This field of angles could be helpful in display generation. For example, if in one area of the field there is a group of increased angles, a determination of whether this increased area of angles is weather, terrain, or an anomaly can be made. For example, if it is known that the terrain over which a plane is flying is non-mountainous and a very small area of increased angles is present, it may be disregarded as an anomaly if it is surrounded by a large area of no returns, and it would suggest a thunderstorm which is much smaller than the smallest known thunderstorms.

In summary, the apparatus and method of the present invention as described in FIGS. 2, 3, and 4, could function as follows: A single image of weather is produced by performing a series of antenna sweeps, in rapid succession, and at different antenna tilt angles. Returns from each sweep are stored in memory, pending completion of all sweeps. Depending on their relative position in the order of sweeps, each return data set is adjusted in orientation; i.e., rotated and translated, to account for changes in aircraft position and orientation during the duration of the data collection process. The returns are then merged and cross-qualified to form a single display. The merging and cross-qualification process uses the above-described general approaches for ground clutter suppression and selection of the sources for displayed returns. Finally, a single image of radar returns is presented to the pilot. The process is then repeated, and the single image is replaced with a new single image. Rotation and translation of the displayed image may be desirable, depending on various factors, such as the speed of the processors used and the speed and rate of change of orientation of the aircraft.

Throughout this description, reference is made to on-board avionics weather radar and to pilots because it is believed that the beneficial aspects of the present invention would be most readily apparent when used by pilots in connection with on-board avionics weather radar; however, it should be understood that the present invention is not intended to be so limited and should be hereby construed to include other non-avionics and terrestrially-based weather radars, as well as radars used by persons other than pilots.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

I claim:

1. An apparatus for displaying weather information comprising:
   a transmitter for generating radar signals;
   an antenna for projecting said radar signals into a radar beam said antenna scanning at a tilt angle;
   a tilt control for controlling the tilt angle of said antenna;
   a receiver for receiving returns of radar signals;
   a multi-scan multi-tilt angle memory for storing the received returns from multiple scans of the antenna;
   a processor for processing said stored returns by merging portions of the returns, compensating for aircraft position changes between scans and generating a display signal;
   a display for displaying said display signal generated by said processor; and
   said display signal representative of the portions of the returns from said multiple scans of said antenna, wherein said scans have a plurality of antenna tilt angles.

2. An apparatus of claim 1 wherein said display signal uses information received from the multiple scans to suppress ground clutter information on said display.

3. An apparatus of claim 1 wherein said display signal has information omitted therefrom that corresponds to information received from one scan but not from another scan, said information omitted is based upon known geometric relationship of beams associated with each scan.

4. An apparatus of claim 1 wherein the display signal is a single image of weather information that is based upon returns from the plurality of antenna tilt angles including:
   a first tilt angle that is a long-range tilt angle that emits a first beam primarily directed to just contact the earth at a radar horizon line, as defined by the antenna and the earth; and
   a second tilt angle that is a mid-range tilt angle that emits a second beam primarily directed along a path higher with respect to the earth than the first beam and that does not contact the earth.

5. An apparatus of claim 4 wherein the plurality of antenna tilt angles further comprises:
   a short-range tilt angle that emits a third beam primarily directed to strike the earth at a point along a line extending from beneath the antenna to the radar horizon line.

6. An apparatus of claim 5 wherein the returns from at least two of said first beam, said second beam, and said third beam are stored in the memory.

7. An apparatus of claim 6 wherein at least two of said first beam, said second beam and said third beam are rotated and translated to account for movement of said antenna.

8. An apparatus of claim 4 wherein said second beam is targeted at a level below a predetermined freeze altitude.

9. An apparatus of claim 8 further including an above the freeze line beam which is targeted at a level above the predetermined freeze altitude.

10. An apparatus of claim 9 where a determination of a vertical extent characteristic of a storm is made from a plurality of beams oriented at different tilt angles with respect to each other.

11. An apparatus of claim 1 wherein an area of expected turbulence is displayed to a pilot in response to detection of a storm below a predetermined flight path.

12. An apparatus of claim 1 wherein cross-qualification of returns from a plurality of transmitted radar beams at a plurality of different tilt angles is used to generate a display to a pilot.

13. A method of displaying weather information to a pilot of an aircraft comprising the steps of:
   sweeping an antenna to generate a first radar beam at a predetermined first tilt angle and collecting and storing a first set of radar returns resulting from said first radar beam;
   changing a tilt angle of said antenna to a second tilt angle;
   sweeping the antenna to generate a second radar beam at said second tilt angle and collecting and storing a second set of radar returns resulting from said second radar beam;
   analyzing said first set of radar returns and said second set of radar returns and making a ground clutter determination; and,
   displaying an image to a pilot based upon said first and said second sets of radar returns, where said image is formed by interspersing portions of said first radar return and said second radar return to form a composite set of radar returns having enhanced suppression of radar returns resulting from involvement of said first radar beam and said second radar beam with terrain.

14. A method of claim 13 wherein said image is formed by using a portion of a set of radar returns which corresponds to returns from targets which are substantially further from the aircraft than a point of substantial tangency of a radar beam with terrain and excludes radar returns from targets which are substantially co-located with said point of substantial tangency.

15. A method of claim 14 wherein said image is formed by using a portion of a set of radar returns which corresponds to returns from targets which are substantially closer to the aircraft than a point of substantial tangency of a radar beam with terrain and excludes radar returns from targets which are substantially co-located with said point of substantial tangency.

16. A method of claim 15 wherein said image is formed by using a geometric analysis to determine a portion of a set of radar returns which corresponds to returns from targets which are closer to the aircraft than returns from terrain which are resulting from a radar beam directed at an earth position substantially closer to the aircraft than a point of tangency of a line extending from the aircraft to terrain and excludes radar returns from targets which are substantially co-located with said earth position.

17. A method of claim 16 wherein said image is formed by using all portions of a set of radar returns which correspond to returns from targets from a radar beam which is directed substantially higher than a line from the aircraft to a point of substantial tangency with terrain.

18. A method of claim 17 further including the steps of:
   making a determination of a freezing altitude in an area in front of the aircraft;
   using said determination along with geometric analysis of returns from a plurality of radar beams having a plurality of tilt angles, so as to discriminate between returns to be displayed and those not to be displayed.

19. A weather radar comprising:

means for transmitting and receiving radar signals from an aircraft;

means for adjusting a tilt angle of an antenna;

means for storing received radar signals from a plurality of antenna sweeps at different tilt angles;

means for generating an image of weather that is based upon the plurality of antenna sweeps at the different tilt angles, wherein said sweeps at different tilt angles and ranges are used to combine portions of returns from said plurality of antenna sweeps to produce a composite return.

20. A weather radar of claim 19 wherein said means for generating an image includes returns from a high tilt angle radar beam whenever said high tilt angle beam detects a storm.

* * * * *